Figure 1:
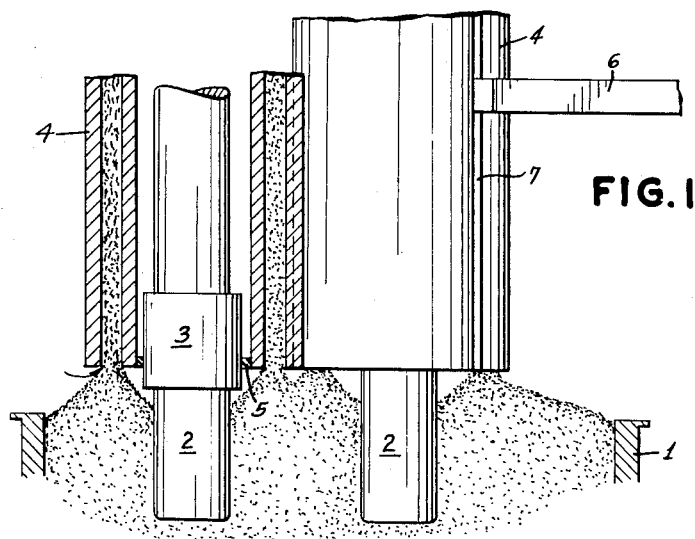

Feb. 7, 1961 M. O. SEM 2,971,040
ARRANGEMENT IN ELECTRIC SMELTING FURNACES
Filed Dec. 18, 1957 2 Sheets-Sheet 1

INVENTOR.
MATHIAS OVROM SEM
BY

ATTORNEYS

Feb. 7, 1961    M. O. SEM    2,971,040
ARRANGEMENT IN ELECTRIC SMELTING FURNACES
Filed Dec. 18, 1957    2 Sheets-Sheet 2

INVENTOR.
MATHIAS OVROM SEM
BY
ATTORNEYS

United States Patent Office 2,971,040
Patented Feb. 7, 1961

2,971,040

ARRANGEMENT IN ELECTRIC SMELTING FURNACES

Mathias Ovrom Sem, Smestad, Oslo, Norway, assignor to Elektrokemisk A/S, Oslo, Norway, a corporation of Norway Filed Dec. 18, 1957, Ser. No. 703,598

Claims priority, application Norway Dec. 22, 1956

4 Claims. (Cl. 13—33)

In the usual electrothermic reduction processes, as for example smelting of pig iron, carbide, ferro alloys and the like, where solid carbon is used as reducing agent, large amounts of gaseous reaction products will be formed. These gases consist mainly of CO constituting 70–95% of the gas volume while the rest consists of $CO_2$ and some $H_2$ and $N_2$. On account of its high content of CO these gases have a very high combustion value and calculations show that the heat value of gases from various reduction processes corresponds to about 40–90% of the heat developed by the electric current, depending on which product is produced.

It is, therefore, of great economic importance to be able to utilize the heat value of the gas in such a way that it will benefit the smelting process. This can, for example, be done by burning the gases and transferring the heat to the ingoing charge so that this will be preheated. If desired, the reducing value of the gas may also be utilized for pre-reduction of the charge before it enters the smelting furnace. By such procedures the gases will also partly be freed from their content of dust so that damage to neighbors is avoided.

It has previously been suggested to use the gases for preheating and pre-reduction in a separate furnace. The transfer of hot and possibly prereduced material to the smelting furnace presents, however, great difficulties and causes also great heat losses. During further work on this matter an arrangement has been found which solves this problem.

The invention consists in the arrangement of a circular shaft around each electrode through which the charge is supplied to the smelting furnace. The gases developed during the smelting process are led up through these shafts through which they will pass in counter current to the charge. Hereby the gases will give off their heat to the charge and preheat it. To reduce the heat losses as much as possible the shafts should be well heat insulated.

It is important that the charge in the shaft does not get directly in touch with the electrode, and to avoid direct transfer of current each shaft is built as a double cylinder. The inner wall of the cylinders is made of, or lined with refractory bricks or a similar insulating material. The charging shafts extend down to the electrode holder and end at such height above the melting crater of the furnace that the charge will slide in towards the electrode below the holder and give a good contact surface between the electrode and the charge. The clearance between the electrode holder and the inner limitation of the shaft should be so large that the electrode and holder can be moved freely in vertical direction.

To reduce the inductive voltage drop as far as possible each shaft is provided with two vertical slots. The flexible connections between the bus bars and the electrode are inserted through the slots and hereby the advantage is obtained that the non-interlaced part of the bus bars will not be extended but will have the same length as in the usual closed furnaces.

If electrode breakage occurs it will be difficult to remove the fragments because of the shafts. It is, therefore, suitable to split the shafts longitudinally, for example by extending the slots for the bus bars all the way down so that the part of the shaft facing the furnace wall can be lifted or removed to facilitate the access to the electrode.

Figure 2:
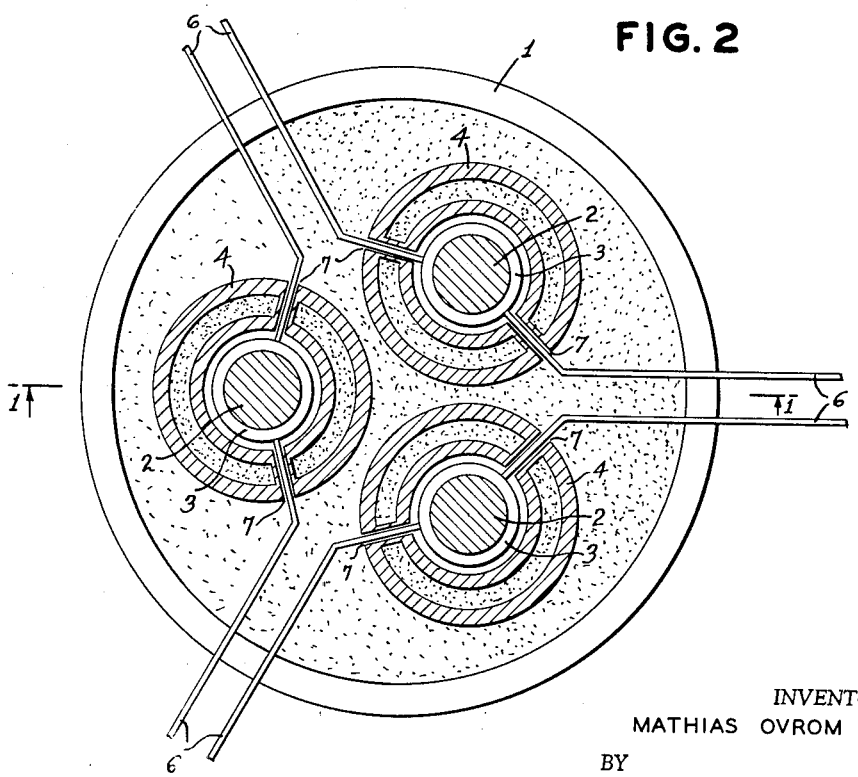
Figure 3:
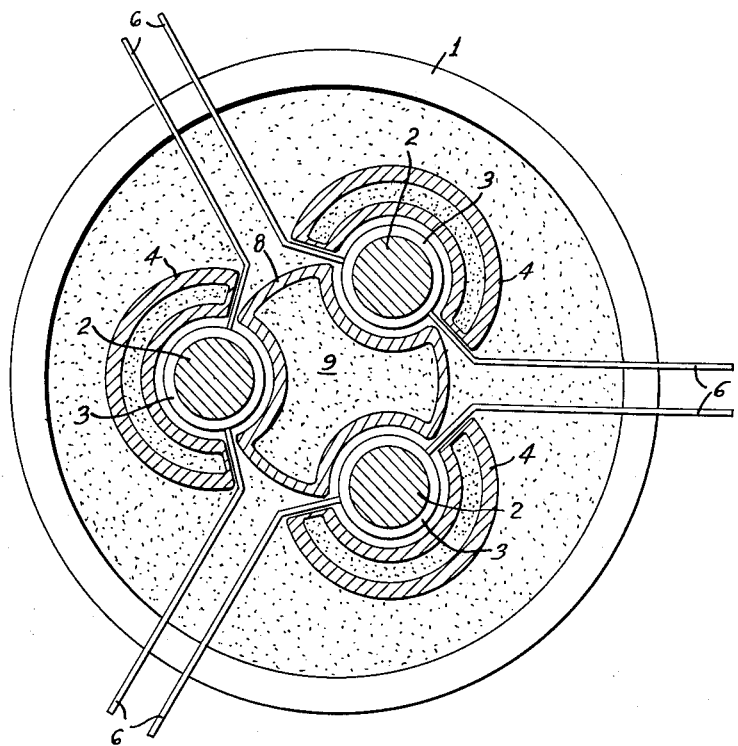

The appended Figs. 1, 2 and 3 show examples of an electric smelting furnace with circular shafts according to the invention.

In the figures, 1 is the furnace pot and 2 the electrode with the holder 3. 4 is the circular charging shaft surrounding each electrode. 5 is a packing ring preventing the gas from escaping upwards between holder and the inner shaft wall.

Figs. 1 and 2 show a modification of the invention where the shafts surround the electrode completely. In this case the current connections 6 are led to the electrode through the slots 7 in the charging cylinder. As mentioned above, these slots may extend through the whole length of the cylinder thus forming two half-cylinders. Such arrangement will, as described above, allow the outer half of the cylinders to be lifted or displaced in case of electrode breakage or the like.

The reaction gases are, as known, developed on or close to the electrode. When the invention is used in closed furnaces, the gases will blow up through the shafts and give off their heat to the charge. For complete utilization of the gases these should, however, be wholly or partly combusted and one must, therefore, in closed furnaces provide for a supply of air for combustion in the shafts. The combustion may for example take place in the shaft. Such combustion will cause an up draft which, in an open furnace as illustrated, will cause air to be sucked in under the lower edge of the shafts, as indicated by an arrow in Figure 1.

Fig. 3 shows a modification where the outer wall of the shafts has been removed in the section between the three electrodes. The inner walls of the shafts are connected by means of separating walls 8 whereby a central charging shaft 9 is formed. This construction is especially suited for furnaces where the electrodes are placed so close to each other that there will not be room for completely circular shafts.

In these drawings I illustrate my invention in connection with a three phase furnace but it is obvious that it may be used with other usual types.

I claim:

1. In combination a furnace pot constructed and arranged to receive a charge to be smelted, an electrode constructed and arranged to extend down into said pot, a pair of members extending up from the pot constructed and arranged substantially to surround such electrode, but with slot-like spaces between such members, said members being formed with hollow spaces within them following the general contour of the electrode through which spaces material to be smelted may be introduced into the pot to be delivered in a zone surrounding but spaced from the electrode, and flexible electrical connections for such electrode passing through said slot-like spaces and constructed and arranged to move up and down in said spaces following movements of the electrode.

2. A structure as specified in claim 1, which further includes sealing means between said members and the electrode to prevent gases from escaping directly around the electrode and to cause gases generated in the furnace to pass up through the charge being admitted to the furnace.

3. A structure as specified in claim 1, comprising three electrodes each substantially surrounded by members as specified, with the slots arranged so that each pair of members has one part toward the outside of the furnace pot and one part toward the inside of the furnace pot.

4. The structure as specified in claim 3 in which the three inner members toward the inside of the furnace are interconnected and have a common passage down through the center through which material to be smelted may be introduced into the furnace.

References Cited in the file of this patent

UNITED STATES PATENTS

| | | |
|---|---|---|
| 644,510 | Frost | Feb. 27, 1900 |
| 978,464 | Louvrier | Dec. 13, 1910 |
| 996,492 | Lorentzen | June 27, 1911 |
| 2,671,124 | Bagley | Mar. 2, 1954 |
| 2,672,491 | Lamb | Mar. 16, 1954 |
| 2,738,373 | Alexander | Mar. 13, 1956 |

FOREIGN PATENTS

| | | |
|---|---|---|
| 819,304 | Germany | Oct. 31, 1951 |